(12) United States Patent
Summons

(10) Patent No.: US 12,466,506 B2
(45) Date of Patent: Nov. 11, 2025

(54) BICYCLE AIR CONDITIONING ASSEMBLY

(71) Applicant: Jahnkay Summons, Mesa, AZ (US)

(72) Inventor: Jahnkay Summons, Mesa, AZ (US)

( * ) Notice: Subject to any disclaimer, the term of this patent is extended or adjusted under 35 U.S.C. 154(b) by 581 days.

(21) Appl. No.: 17/953,298

(22) Filed: Sep. 26, 2022

(65) Prior Publication Data

US 2024/0101213 A1    Mar. 28, 2024

(51) Int. Cl.
*B62J 45/00*    (2020.01)
*B60H 1/00*    (2006.01)

(52) U.S. Cl.
CPC .......... *B62J 45/00* (2020.02); *B60H 1/00428* (2013.01); *B60H 1/00535* (2013.01)

(58) Field of Classification Search
CPC . B62J 50/30; B62J 45/00; B62J 99/00; B60H 1/00428; B60H 1/00535
USPC ...................................... 280/288.4
See application file for complete search history.

(56) References Cited

U.S. PATENT DOCUMENTS

| 4,555,911 | A  | * | 12/1985 | Kusisto ..................... | B62J 33/00 62/425 |
| 6,935,944 | B2 | * | 8/2005 | Bigelow, Jr. ........ | B60H 1/00407 454/143 |
| D737,180 | S  | * | 8/2015 | Gholston ..................... | D12/114 |
| 10,215,453 | B2 |   | 2/2019 | Hammond | |
| 10,259,287 | B2 | * | 4/2019 | Reynolds ........... | B60H 1/00407 |
| 11,834,092 | B1 | * | 12/2023 | Fisher ..................... | B62B 7/004 |
| 11,993,331 | B2 | * | 5/2024 | Perlo .................. | B60H 1/00407 |
| 2005/0107026 | A1 | * | 5/2005 | Bigelow, Jr. ........ | B60H 1/00407 454/143 |
| 2013/0186120 | A1 |   | 7/2013 | Lee | |
| 2014/0319886 | A1 | * | 10/2014 | Coffman ................ | A47D 15/00 297/180.13 |
| 2016/0231010 | A1 |   | 8/2016 | Zhao | |
| 2018/0236913 | A1 | * | 8/2018 | Abreu ...................... | B62B 9/14 |
| 2021/0316806 | A1 | * | 10/2021 | Perlo ....................... | B62J 33/00 |
| 2024/0075974 | A1 | * | 3/2024 | Noel ..................... | B62B 5/0053 |
| 2024/0101213 | A1 | * | 3/2024 | Summons ................ | B62J 45/00 |

FOREIGN PATENT DOCUMENTS

| DE | 112017001102 T5 | * | 12/2018 | ......... B60H 1/00407 |
| FR | 3060471 A1 | * | 6/2018 | .............. B62J 17/00 |
| JP | 2004314920 A | * | 11/2004 | |
| JP | 2004330884 A | * | 11/2004 | |
| JP | 2015016825 A | * | 1/2015 | |
| JP | 6117038 B2 | * | 4/2017 | |
| JP | 2017154645 A | * | 9/2017 | ......... B60H 1/00407 |
| WO | WO2020026082 | | 2/2020 | |

* cited by examiner

*Primary Examiner* — James A Shriver, II

(57) ABSTRACT

A bicycle air conditioning assembly for cooling a rider of a bicycle includes a bicycle has a frame and a housing curving upwardly and forwardly on the bicycle such that the housing extends over a rider of the bicycle. An air conditioning unit is integrated into the housing and the air conditioning unit is actuatable into a cooling condition to blow cooled air outwardly from the housing to cool the rider when the rider is riding the bicycle. A control box is attached to the handlebars such that the control box is accessible to the rider. The control box is in communication with the air conditioning unit for controlling a temperature of the air conditioning unit and for actuating or de-actuating the air conditioning unit.

8 Claims, 5 Drawing Sheets

BICYCLE AIR CONDITIONING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to air conditioning devices and more particularly pertains to a new air conditioning device for cooling a rider of a bicycle. The device includes a curved housing mounted to a bicycle such that the curved housing curves over a rider of the bicycle. The device includes an air conditioning unit integrated into the housing and a control panel mounted the bicycle. The air conditioning unit blows cooled air onto the rider for cooling the rider while the rider is riding the bicycle.

(2) Description of Related Art Including Information Disclosed Under 37 CFR 1.97 and 1.98

The prior art relates to air conditioning devices including an umbrella mounted to a bicycle for shading a rider. The prior art discloses a bicycle air conditioner that includes a fan driven by a front wheel of the bicycle and a funnel containing ice through which the fan blows air. The prior discloses an air conditioner system structured to be mounted to a motorcycle. The prior art discloses an air conditioning system for an open motorized vehicle that includes a cab and an air conditioning system mounted within the cab. The prior art discloses a variety of solar powered air conditioners. The prior art discloses a bicycle air conditioner that includes a frame extending over a rider of a bicycle, an air conditioning unit attached to the frame for blowing cooled air onto the rider and a power supply that extends downwardly along a rear wheel of the bicycle. The prior art discloses an ornamental design of a bicycle canopy which includes a frame extending upwardly from a frame of a bicycle and a canopy which extends over a rider of the bicycle.

BRIEF SUMMARY OF THE INVENTION

An embodiment of the disclosure meets the needs presented above by generally comprising a bicycle has a frame and a housing curving upwardly and forwardly on the bicycle such that the housing extends over a rider of the bicycle. An air conditioning unit is integrated into the housing and the air conditioning unit is actuatable into a cooling condition to blow cooled air outwardly from the housing to cool the rider when the rider is riding the bicycle. A control box is attached to the handlebars such that the control box is accessible to the rider. The control box is in communication with the air conditioning unit for controlling a temperature of the air conditioning unit and for actuating or de-actuating the air conditioning unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
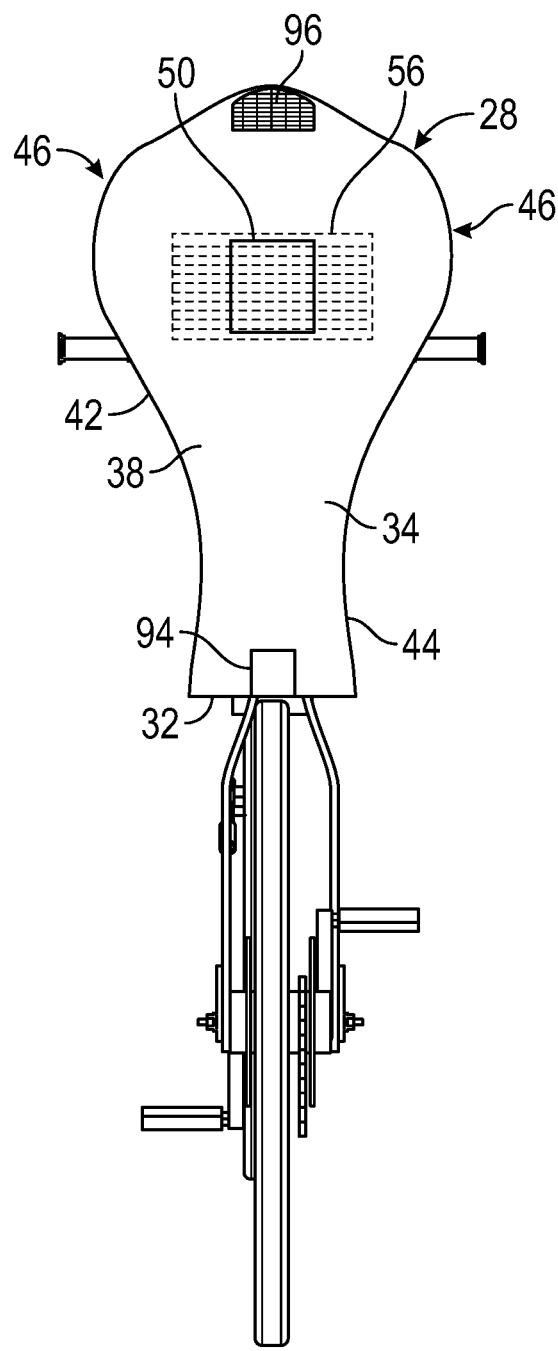
FIG. 1 is a back view of a bicycle air conditioning assembly according to an embodiment of the disclosure.
Figure 2:
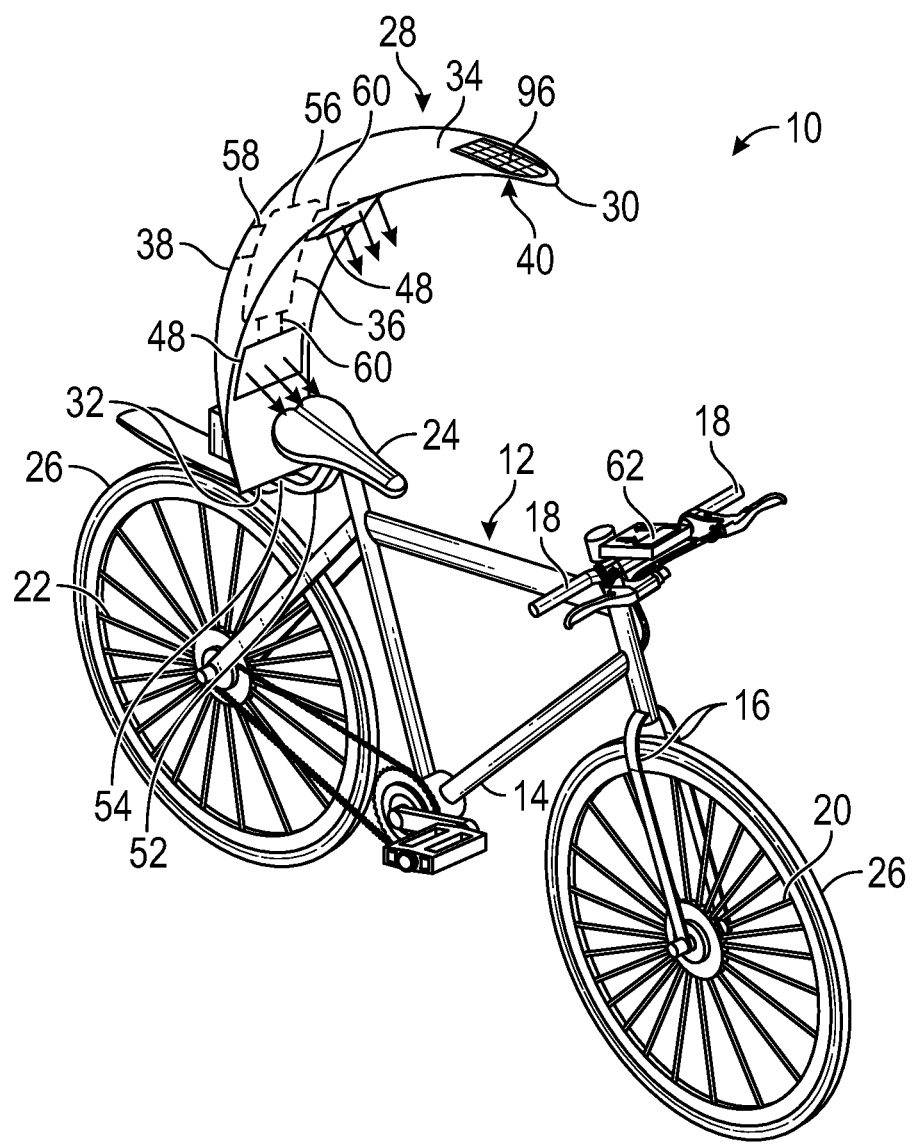
FIG. 2 is a perspective view of an embodiment of the disclosure.
Figure 3:
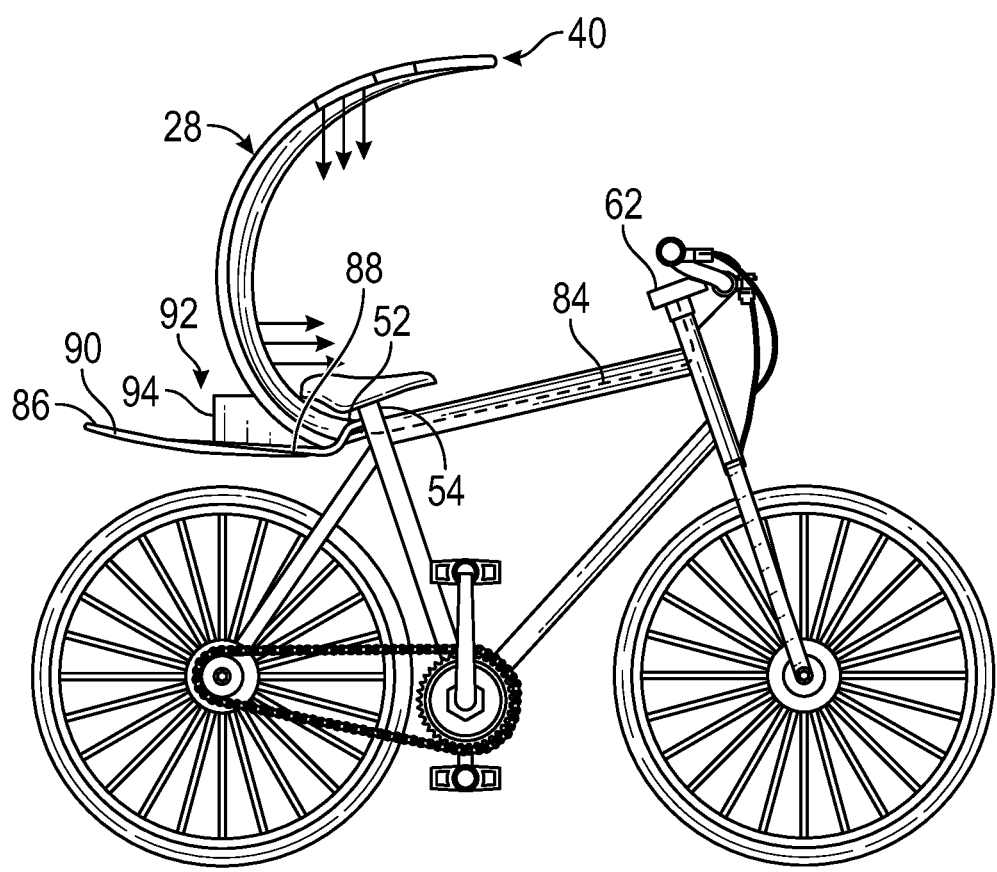
FIG. 3 is a right side view of an embodiment of the disclosure.
Figure 4:
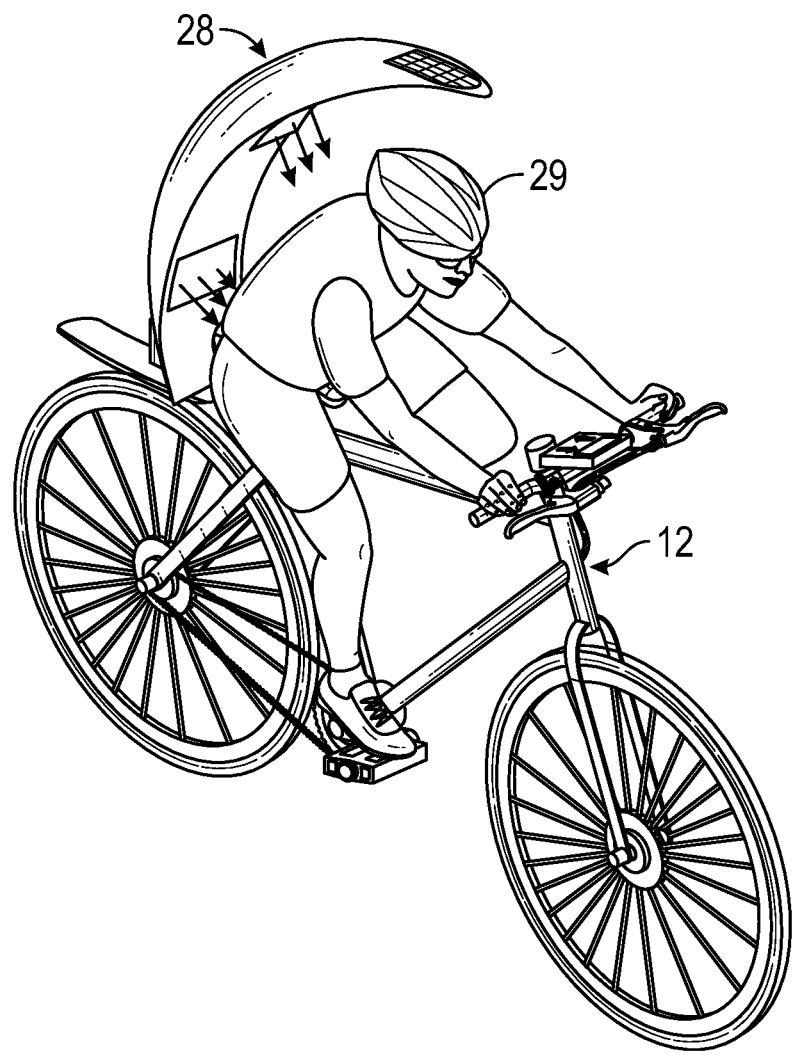
FIG. 4 is a perspective in-use view of an embodiment of the disclosure.
Figure 5:
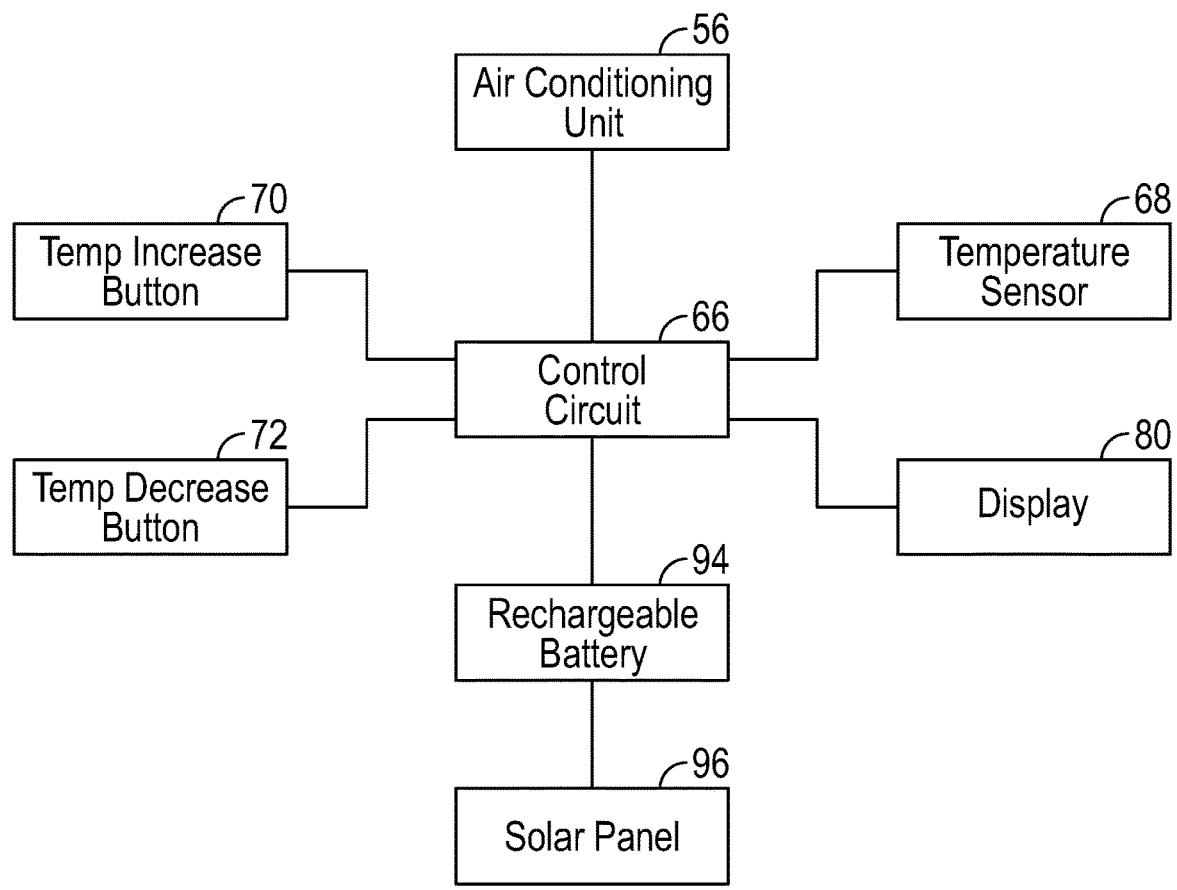
FIG. 5 is a schematic view of an embodiment of the disclosure.
Figure 6:
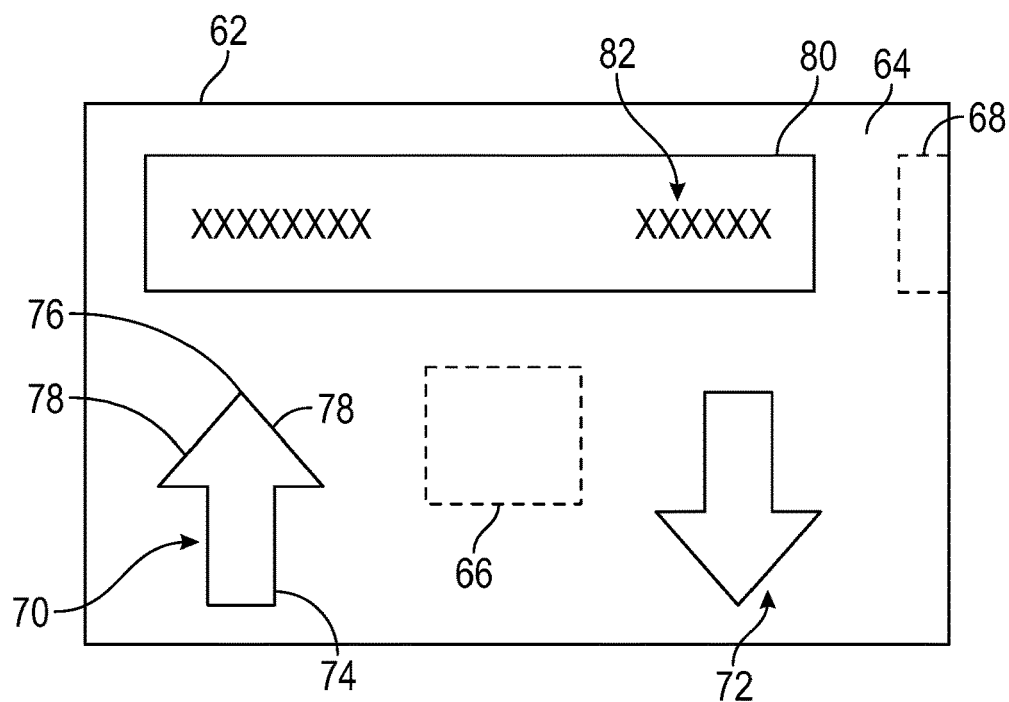
FIG. 6 is a top view of control box of an embodiment of the disclosure.

With reference now to the drawings, and in particular to FIGS. 1 through 6 thereof, a new air conditioning device embodying the principles and concepts of an embodiment of the disclosure and generally designated by the reference numeral 10 will be described.

As best illustrated in FIGS. 1 through 6, the bicycle air conditioning assembly 10 generally comprises a bicycle 12 has a frame 14, a pair of forks 16 rotatably integrated into the frame 14, a pair of handle bars 18 attached to the forks 16, a front wheel 20 rotatably attached to the forks 16, a rear wheel 22 rotatably attached to the frame 14, and a seat 24 movably integrated into the frame 14. The frame 14 may be comprised of a rigid a lightweight material, including but not being limited to, carbon fiber. Additionally, each of the rear wheel 22 and the front wheel 20 includes a tubeless tire 26 that is comprised of recycled materials and structured to remain in a rigid condition without having to be inflated. Thus, the tubeless tire 26 on the front wheel 20 and the rear wheel 22 will not deflate in the event of a tire puncture. In this way the tubeless tire 26 on neither the front wheel 20 nor the rear wheel 22 will have to be replaced or repaired due to being punctured.

A housing 28 is attached to the bicycle 12 and the housing 28 curves upwardly and forwardly on the bicycle 12 such that the housing 28 extends over a rider 29 of the bicycle 12. The housing 28 has a first end 30, a second end 32 and an outer wall 34 extending between the first end 30 and the second end 32 and the outer wall 34 has a front side 36 and a back side 38. The front side 36 is concavely arcuate between the first end 30 and the second end 32 such that the front side 36 defines a semi-circular shape. Additionally, the back side 38 is rounded such that the back side 38 curves away from the front side 36. The first end 30 tapers to a rounded point 40 having the back side 38 sloping to join the front side 36 at the rounded point 40. Furthermore, the second end 32 is flattened having the back side 38 sloping to join the front side 36 at the second end 32.

The housing 28 has a first lateral edge 42 and a second lateral edge 44 each extending between the first end 30 and the second end 32 and each of the front side 36 and the back side 38 intersects at the first lateral edge 42 and the second lateral edge 44. Each of the first lateral edge 42 and the second lateral edge 44 has a curved portion 46 curving outwardly from a centerline of the housing 28. Thus, the housing 28 has a shape resembling a hood of a cobra when viewed from the back side 38. The front side 36 has a pair of air openings 48 each extending into an interior of the housing 28 to pass air through the front side 36. Each of the air openings 48 is spaced from a respective one of the first end 30 and the second end 32 of the housing 28. Additionally, the back side 38 has an intake opening 50 extending into the interior of the housing 28 to pass air through the back side 38.

A mount 52 is provided and the mount 52 is coupled to and extends rearwardly from a post 54 of the seat 24. The second end 32 of the housing 28 is attached to a distal end 54 of the mount 52 with respect to the post 54 such that the housing 28 extends upwardly from the mount 52 and curves forwardly toward the handle bars 18. In this way the front side 36 of the outer wall 34 of the housing 28 curves over the rider 29 having each of the air openings 48 is directed toward the rider 29 when the rider 29 sits on the seat 24. An air conditioning unit 56 is integrated into the housing 28 and the air conditioning unit 56 is actuatable into a cooling condition having the air conditioning unit 56 blowing cooled air outwardly from the housing 28. In this way the air conditioning unit 56 cools the rider 29 when the rider 29 is riding the bicycle 12.

The air conditioning unit 56 has an intake 58 and an exhaust 60 and the air conditioning unit 56 urges air inwardly through the intake 58 and outwardly through the exhaust 60 when the air conditioning unit 56 is turned on. The intake 58 is in fluid communication with the intake opening 50 in the back side 38 of the outer wall 34 of the housing 28 thereby facilitating the air conditioning unit 56 draw air inwardly through the intake opening 50. The exhaust 60 is in fluid communication with each of the air openings 48 in the front side 36 of the outer wall 34 of the housing 28 thereby facilitating the air conditioning unit 56 to blow the cooled air outwardly through the air openings 48. The air conditioning unit 56 may comprise an electronic air conditioning unit that includes components common to electric air conditioners, including but not being limited to, a compressor, an evaporator and a blower.

A control box 62 is attached to the handle bars 18 such that the control box 62 is accessible to the rider 29. The control box 62 is in communication with the air conditioning unit 56 for controlling a temperature of the air conditioning unit 56 and for actuating or de-actuating the air conditioning unit 56, and the control box 62 has a top wall 64 that is visible to the rider 29. A control circuit 66 is integrated into the control box 62 and the control circuit 66 is electrically coupled to the air conditioning unit 56. The control circuit 66 receives an actuate input and the air conditioning unit 56 is actuated when the control circuit 66 receives the actuate input.

A temperature sensor 68 is attached to the control box 62 for sensing the temperature of ambient air and the temperature senor 68 is electrically coupled to the control circuit 66. The control circuit 66 receives the actuate input when the temperature sensor 68 senses a pre-determined trigger temperature. Additionally, the temperature sensor 68 may comprise an electronic thermometer or the like. A temperature increase button 70 is movably integrated into the top wall 64 of the control box 62 and the temperature increase button 70 is electrically coupled to the control circuit 66. The temperature increase button 70 increases the pre-determined trigger temperature when the temperature increase button 70 is depressed. A temperature decrease button 72 is movably integrated into the top wall of the control box 62 and the temperature decrease button 72 is electrically coupled to the control circuit 66. The temperature decrease button 72 decreases the pre-determined trigger temperature when the temperature decrease button 72 is depressed. Each of the temperature increase button 70 and the temperature decrease button 72 may have a stem portion 74 and an arrow portion 76 which has a pair of sides 78 that intersect at a point such that the temperature increase button 70 and the temperature decrease button 72 has the appearance of a directional arrow.

A display 80 is integrated into the top wall of the control box 62 and the display 80 is electrically coupled to the control circuit 66. The display 80 displays indicia 82 comprising letters and numbers visually communicating the trigger temperature and the temperature sensed by the temperature sensor 68. The display 80 may comprise a liquid crystal display or other type of electronic display. A conductor 84 is integrated into the frame 14 and the conductor 84 extends between the control box 62 and the housing 28. The conductor 84 is electrically coupled between the control circuit 66 and the air conditioning unit 56 and the conductor 84 comprises an insulated wire commonly associated with powered circuitry.

A panel 86 is provided which has a coupled end 88 and an upper surface 90 and the coupled end 88 is attached to the mount 52 having the panel 86 extending over the rear wheel 22 such that the upper surface 90 lies on a horizontal plane. A power supply 92 is attached to the bicycle 12 and the power supply 92 is electrically coupled to the air conditioning unit 56. The power supply 92 comprises a rechargeable battery 94 that is positioned on the upper surface 90 of the panel 86 and the rechargeable battery 94 is electrically coupled to the air conditioning unit 56. The power supply 92 includes a solar panel 96 that is integrated into the back side 38 of the outer wall 34 of the housing 28 such that the solar panel 96 is exposed to sunlight. Additionally, the solar panel 96 is electrically coupled to the rechargeable battery 94 for charging the rechargeable battery 94.

In use, the rider 29 manipulates either the temperature increase button 70 or the temperature decrease button 72 to establish the trigger temperature. In this way the air conditioning unit 56 is actuated to cool the rider 29 when the ambient temperature exceeds a temperature chosen by the rider 29. Thus, air conditioning unit 56 enhances comfort for the rider 29 while the rider 29 is riding the bicycle 12. The solar panel 96 charges the rechargeable battery 94 while the solar panel 96 is exposed to sunlight thereby facilitating continuous operation of the air conditioning unit 56 while the bicycle 12 is being ridden outdoors. Furthermore, the tubeless tire 26 on each of the front wheel 20 and the rear wheel 22 ensure the bicycle 12 can be continuously ridden in spite of tire punctures that might occur.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bicycle air conditioning assembly for cooling a rider of a bicycle, said assembly comprising:

the bicycle having a frame, a pair of forks rotatably integrated into the frame, a pair of handle bars attached to the forks, a front wheel rotatably attached to said forks, a rear wheel rotatably attached to said frame, and a seat movably integrated into said frame;

a housing being attached to said bicycle, said housing curving upwardly and forwardly on said bicycle wherein said housing is configured to extend over a rider of the bicycle;

an air conditioning unit being integrated into said housing, said air conditioning unit being actuatable into a cooling condition having said air conditioning unit blowing cooled air outwardly from said housing wherein said air conditioning unit is configured to cool the rider when the rider is riding said bicycle;

a control box being attached to said handlebars such that said control box is accessible to the rider, said control box being in communication with said air conditioning unit for controlling a temperature of said air conditioning unit and for actuating or de-actuating said air conditioning unit;

wherein said housing has a first end, a second end and an outer wall extending between said first end and said second end, said outer wall having a front side and a back side, said front side being concavely arcuate between said first end and said second end, such that said front side defines a semi-circular shape, said back side being rounded such that said back side curves away from said front side, said first end tapering to a point having said back side sloping to join said front side at said point, said second end being flattened having said back side sloping to join said front side at said second end, said housing having a first lateral edge and a second lateral edge each extending between said first end and said second end, each of said front side and said back side intersecting at said first lateral edge and said second lateral edge, each of said first lateral edge and said second lateral edge having a curved portion curving outwardly from a centerline of said housing such that said housing has a shape resembling a hood of a cobra when viewed from said back side;

wherein said front side has a pair of air openings each extending into an interior of said housing wherein said air openings are configured to pass air through said front side, each of said air openings being spaced from a respective one of said first end and said second end of said housing; and wherein said back side has an intake opening extending into said interior of said housing wherein said intake opening is configured to pass air through said back side.

2. The assembly according to claim 1, further comprising a mount being coupled to and extending rearwardly from a post of said seat, said second end of said housing being attached to a distal end of said mount with respect to said post such that said housing extends upwardly from said mount and curves forwardly toward said handlebars wherein said front side of said outer wall of said housing is configured to curve over the rider having each of said air openings being directed toward the rider.

3. The assembly according to claim 1, wherein said air conditioning unit has an intake and an exhaust, said air conditioning unit urging air inwardly through said intake and outwardly through said exhaust when said air conditioning unit is turned on, said intake being in fluid communication with said intake opening in said back side of said outer wall of said housing wherein said air conditioning unit is configured to draw air inwardly through said intake opening, said exhaust being in fluid communication with each of said air openings in said front side of said outer wall of said housing wherein said air conditioning unit is configured to blow the cooled air outwardly through said air openings.

4. A bicycle air conditioning assembly for cooling a rider of a bicycle, said assembly comprising:

the bicycle having a frame, a pair of forks rotatably integrated into the frame, a pair of handle bars attached to the forks, a front wheel rotatably attached to said forks, a rear wheel rotatably attached to said frame, and a seat movably integrated into said frame;

a housing being attached to said bicycle, said housing curving upwardly and forwardly on said bicycle wherein said housing is configured to extend over a rider of the bicycle;

an air conditioning unit being integrated into said housing, said air conditioning unit being actuatable into a cooling condition having said air conditioning unit blowing cooled air outwardly from said housing wherein said air conditioning unit is configured to cool the rider when the rider is riding said bicycle;

a control box being attached to said handlebars such that said control box is accessible to the rider, said control box being in communication with said air conditioning unit for controlling a temperature of said air conditioning unit and for actuating or de-actuating said air conditioning unit;

wherein said control box has a top wall being visible to the rider;

wherein said assembly includes a control circuit being integrated into said control box, said control circuit being electrically coupled to said air conditioning unit, said control circuit receiving an actuate input, said air conditioning unit being actuated when said control circuit receives said actuate input; and wherein said assembly includes a temperature sensor being attached to said control box for sensing the temperature of ambient air, said temperature senor being electrically coupled to said control circuit, said control circuit receiving said actuate input when said temperature sensor senses a pre-determined trigger temperature.

5. The assembly according to claim 4, further comprising:

a temperature increase button being movably integrated into said top wall of said control box, said temperature increase button being electrically coupled to said control circuit, said temperature increase button increasing said pre-determined trigger temperature when said temperature increase button is depressed; and a temperature decrease button being movably integrated into said top wall of said control box, said temperature decrease button being electrically coupled to said control circuit, said temperature decrease button decreasing said pre-determined trigger temperature when said temperature decrease button is depressed.

6. The assembly according to claim 4, further comprising a conductor being integrated into said frame, said conductor extending between said control box and said housing, said conductor being electrically coupled between said control circuit and said air conditioning unit.

7. The assembly according to claim 2, further comprising:

a panel having a coupled end and an upper surface, said coupled end being attached to said mount having said panel extending over said rear wheel such that said upper surface lies on a horizontal plane; and a power supply being attached to said bicycle, said power supply being electrically coupled to said air conditioning unit, said power supply comprising:

a rechargeable battery being positioned on said upper surface of said panel, said rechargeable battery being electrically coupled to said air conditioning unit; and a solar panel being integrated into said back side of said outer wall of said housing wherein said solar panel is configured to be exposed to sunlight, said solar panel being electrically coupled to said rechargeable battery for charging said rechargeable battery.

8. A bicycle air conditioning assembly for cooling a rider of a bicycle, said assembly comprising:

the bicycle having a frame, a pair of forks rotatably integrated into the frame, a pair of handle bars attached to the forks, a front wheel rotatably attached to said forks, a rear wheel rotatably attached to said frame, and a seat movably integrated into said frame;

a housing being attached to said bicycle, said housing curving upwardly and forwardly on said bicycle wherein said housing is configured to extend over a rider of the bicycle, said housing having a first end, a second end and an outer wall extending between said first end and said second end, said outer wall having a front side and a back side, said front side being concavely arcuate between said first end and said second end, such that said front side defines a semi-circular shape, said back side being rounded such that said back side curves away from said front side, said first end tapering to a point having said back side sloping to join said front side at said point, said second end being flattened having said back side sloping to join said front side at said second end, said housing having a first lateral edge and a second lateral edge each extending between said first end and said second end, each of said front side and said back side intersecting at said first lateral edge and said second lateral edge, each of said first lateral edge and said second lateral edge having a curved portion curving outwardly from a centerline of said housing such that said housing has a shape resembling a hood of a cobra when viewed from said back side, said front side having a pair of air openings each extending into an interior of said housing wherein said air openings are configured to pass air through said front side, each of said air openings being spaced from a respective one of said first end and said second end of said housing, said back side having an intake opening extending into said interior of said housing wherein said intake opening is configured to pass air through said back side;

a mount being coupled to and extending rearwardly from a post of said seat, said second end of said housing being attached to a distal end of said mount with respect to said post such that said housing extends upwardly from said mount and curves forwardly toward said handlebars wherein said front side of said outer wall of said housing is configured to curve over the rider having each of said air openings being directed toward the rider;

an air conditioning unit being integrated into said housing, said air conditioning unit being actuatable into a cooling condition having said air conditioning unit blowing cooled air outwardly from said housing wherein said air conditioning unit is configured to cool the rider when the rider is riding said bicycle, said air conditioning unit having an intake and an exhaust, said air conditioning unit urging air inwardly through said intake and outwardly through said exhaust when said air conditioning unit is turned on, said intake being in fluid communication with said intake opening in said back side of said outer wall of said housing wherein said air conditioning unit is configured to draw air inwardly through said intake opening, said exhaust being in fluid communication with each of said air openings in said front side of said outer wall of said housing wherein said air conditioning unit is configured to blow the cooled air outwardly through said air openings;

a panel having a coupled end and an upper surface, said coupled end being attached to said mount having said panel extending over said rear wheel such that said upper surface lies on a horizontal plane;

a control box being attached to said handlebars such that said control box is accessible to the rider, said control box being in communication with said air conditioning unit for controlling a temperature of said air conditioning unit and for actuating or de-actuating said air conditioning unit, said control box having a top wall being visible to the rider;

a control circuit being integrated into said control box, said control circuit being electrically coupled to said air conditioning unit, said control circuit receiving an actuate input, said air conditioning unit being actuated when said control circuit receives said actuate input;

a temperature sensor being attached to said control box for sensing the temperature of ambient air, said temperature senor being electrically coupled to said control circuit, said control circuit receiving said actuate input when said temperature sensor senses a pre-determined trigger temperature;

a temperature increase button being movably integrated into said top wall of said control box, said temperature increase button being electrically coupled to said control circuit, said temperature increase button increasing said pre-determined trigger temperature when said temperature increase button is depressed;

a temperature decrease button being movably integrated into said top wall of said control box, said temperature decrease button being electrically coupled to said control circuit, said temperature decrease button decreasing said pre-determined trigger temperature when said temperature decrease button is depressed;

a display being integrated into said top wall of said control box, said display being electrically coupled to said control circuit, said display displaying indicia comprising letters and numbers visually communicating said trigger temperature and said temperature sensed by said temperature sensor;

a conductor being integrated into said frame, said conductor extending between said control box and said housing, said conductor being electrically coupled between said control circuit and said air conditioning unit; and a power supply being attached to said bicycle, said power supply being electrically coupled to said air conditioning unit, said power supply comprising:

a rechargeable battery being positioned on said upper surface of said panel, said rechargeable battery being electrically coupled to said air conditioning unit; and a solar panel being integrated into said back side of said outer wall of said housing wherein said solar panel is configured to be exposed to sunlight, said solar panel being electrically coupled to said rechargeable battery for charging said rechargeable battery.

* * * * *